W. H. BATES, Jr.
METALLURGICAL SMOKE FILTER.
APPLICATION FILED NOV. 30, 1917.
1,302,281.
Patented Apr. 29, 1919.
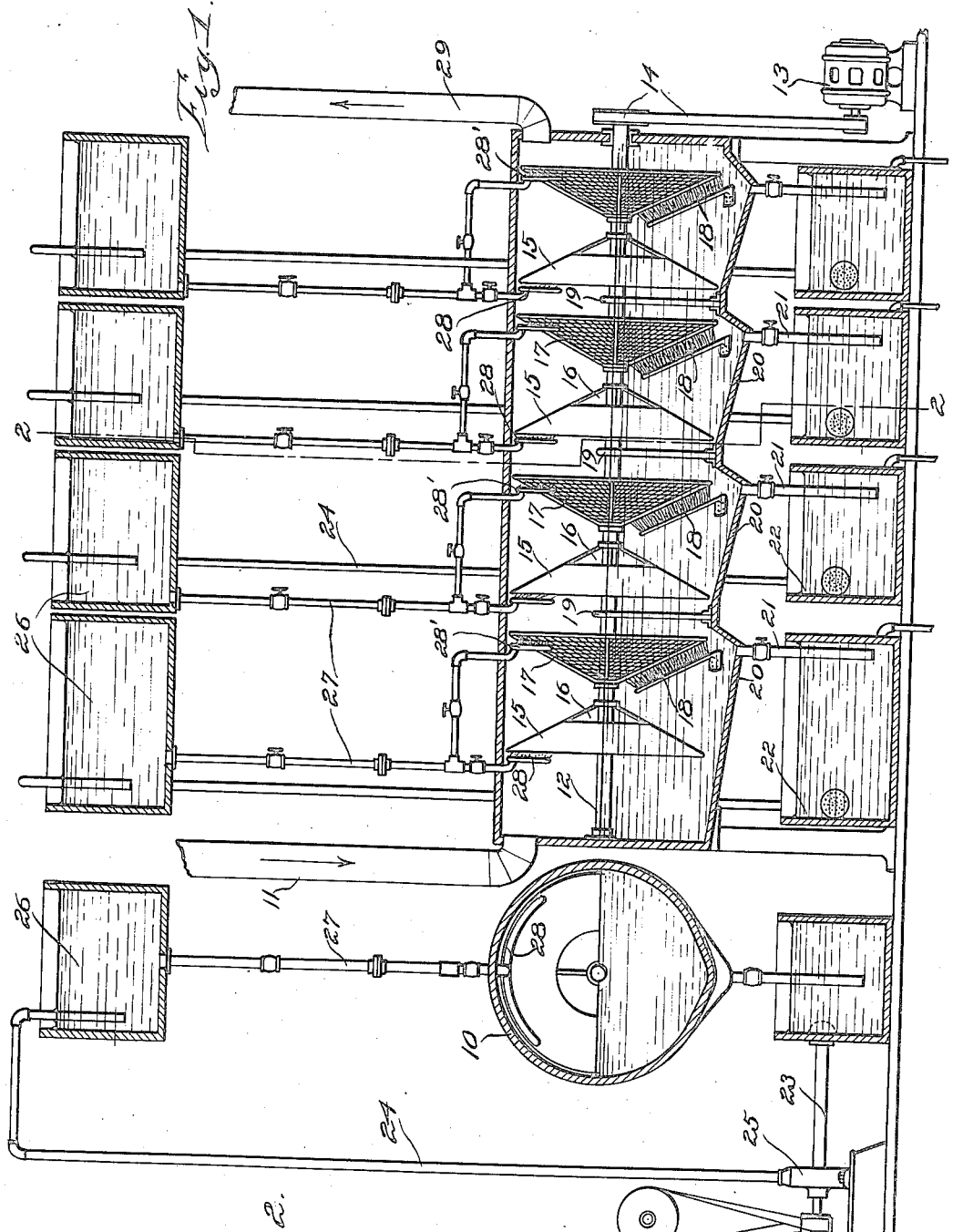
Inventor:
William H. Bates, Jr.
by Clyde L. Rogers
his Att'y.

UNITED STATES PATENT OFFICE.

WILLIAM H. BATES, JR., OF BOSTON, MASSACHUSETTS.

METALLURGICAL SMOKE-FILTER.

1,302,281.   Specification of Letters Patent.   Patented Apr. 29, 1919.

Application filed November 30, 1917. Serial No. 204,706.

*To all whom it may concern:*

Be it known that I, WILLIAM H. BATES, Jr., a citizen of the United States, and resident of Allston, Boston, county of Suffolk, Commonwealth of Massachusetts, have invented an Improvement in Metallurgical Smoke-Filters, of which the following description in connection with the accompanying drawings, is a specification, like characters on the drawings representing like parts in each of the several views.

This invention relates to filters or selective purifiers for treating the fumes from metallurgical furnaces as employed in the reduction of ores such as the common copper ores including pyrites, chalcocite and carbonates of lead, zinc, etc. A prime object of the invention is to provide improved means for bringing the fumes into contact with a relatively large surface of liquid with a relative agitation of a nature best calculated to cause the liquid to take up into solution selectively, certain ingredients as desired from the fumes, so that certain portions of the smoke content as delivered into the apparatus may be removed therefrom in solution, while other predetermined portions and ingredients are permitted to pass out in gaseous form. To this end I provide a series of revolving baffles calculated to retard the flow of the gas and chill the same, these baffles being arranged so as to deflect the course of the gases and bring the same into contact with the solution in the container tank. I provide further for coöperation with these baffles reticulated or foraminous rotary filters adapted to coöperate in bringing the gas into intimate contact with the liquid in the most effective manner possible for chilling the gas and causing the precipitation of the desired components thereof. The foregoing and other objects and advantages of the invention will more fully appear from the following detailed description, and the distinctive features of novelty will be pointed out in the appended claims.

Referring to the drawings:

Figure 1 shows a lengthwise vertical section of an apparatus constructed in accordance with my invention; and Fig. 2 is a transverse vertical section thereof on line 2—2 of Fig. 1.

The principal operative parts of the present apparatus are housed in a horizontally extending closed tank 10 generally cylindrical in cross section. Into one end of this tank leads a conduit pipe 11 discharging into the tank the hot fumes to be treated. Journaled to extend lengthwise of the tank and centrally thereof is a shaft 12 continuously driven by suitable means such as a motor 13 with belt and pulley connection 14 to said shaft. On this shaft are fixed at intervals a series of rotatable baffle members 15 conical in form with the dished or concave side facing toward the inlet, the outer peripheral portions of these members presenting plate faces while the central portions thereof have passages 16 therethrough to permit the flow of the liquid endwise through the tank. Intermediate the respective baffle members are arranged a series of rotary filter members 17 likewise conical in form but facing oppositely to the baffle members, *i. e.*, toward the discharge end of the tank. These filter members are made with reticulated or foraminous faces of acid resisting metal or material or vegetable fiber, and the mesh thereof in the members at the entrance end of the tank may be somewhat coarser than that of those adjacent the discharge end for most efficient action in filtering and cleaning the fumes transmitted through the apparatus. Each of these rotary filters has associated therewith a brush 18 fixed to the interior of the tank and engaging the outer side of the mesh surface as the filters rotate to keep the same clear and open. Preferably and as shown, each of the several baffle members with an adjacent filter member constitutes a couple operative in a portion of the tank which may be segregated, or partially so, from the rest of the tank. For this purpose I provide a series of partitions 19 removably mounted to extend up from the bottom of the tank at intervals and as shown up some little above the center thereof to divide the tank lengthwise into a series, shown as four, compartments in the lower portion thereof, the removability of these partitions making it possible to divide the tank into a variable number of compartments of different sizes as required for most effective use in selective segregation of ingredients of the fumes as presently further explained. The bottom of the tank is formed with a series of sediment basins 20 arranged so that one thereof will be in each of the compartments as divided off by the partitions 19 and from the bottom of each sediment basin a valve controlled conduit 21 leads into a receiving tank 22, From these tanks 22 the liquid may be returned through pipes 23, 24 by means of a suitable power driven pump 25 shown as of a centrifugal type into a corresponding series of overhead tanks 26. These tanks have leading therefrom a series of down pipes 27 with spray heads 28 at their lower extremities, each down pipe 27 as shown having two branches supplying respectively a spray head 28 adjacent, and delivering upon, a baffle 15 and the other spray head 28' delivering against the adjacent rotary filter 17. Thus it will be seen each of the tank compartments as partitioned off by the partitions 19 has associated therewith a separate liquid circulating system, assuming of course that the liquid in its circulation will be kept below the tops of the partitions 19 in the tank. Thus different liquid solutions may be employed in the successive compartments of the tank of a nature calculated to cause segregation and precipitation of different ingredients or components of the fumes being treated into the solutions in the several compartments and hence capable of being drawn off separately and selectively from the several sediment basins 20 into the respective catch tanks 22. In the operation of the apparatus the conical revolving baffle members 15 retard and cool the fumes deflecting the course thereof into the solution, and in conjunction with the spray heads 28 making a maximum area of contact between the solution and the fumes. The conical form of the baffles also tends to condense the fumes and facilitates the lengthwise flow through the tank 10. The rotating filters 17 with their reticulated surfaces passing through the liquid and leaving the liquid, will bear a film of moisture as they leave the solution, to be impinged on by the lengthwise flowing fumes, thus increasing the fume chilling area of liquid presented. The rotary filters being conical in form increases the extent of operative surface thereof and also sets up to some extent a flushing action therethrough as they revolve. While I have herein shown the filters alternating with the baffle plates, i. e., one filter member associated with each baffle plate in each compartment, it is to be understood that this is merely illustrative and that for certain uses I may employ two filters or more to one baffle plate in each compartment or vice versa. The deposits in the sediment basins 20 or certain of them, will include usually fine particles of furnace charge, antimony trioxid, lead sulfate, etc., which will be precipitated in powdered form, while the sulfates of copper, zinc, etc., go into solution. The gases as thus cleared of these, flue dusts and fumes, and consisting or relatively pure sulfur dioxid, though perhaps containing more or less nitrogen, are treated in the last compartments of the apparatus as shown, or in a second like apparatus containing a suitable solution to unite with the sulfur dioxid as milk of lime to form calcium sulfite. I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having described my invention, what I claim as new and desire to secure by Letters Patent is:

1. A metallurgical smoke filter, comprising a horizontally extending closed tank having an entrance conduit for fumes at one end and a discharge at its other end, means for circulating liquid through said tank, and means for bringing said liquid into contact with the passing fumes consisting in spaced apart rotary baffles of conical form and each with a central passage, and reticulated rotary filters associated therewith.

2. A metallurgical smoke filter, comprising a closed tank having means for circulating liquid therethrough and means for circulating fumes therethrough, and means for promoting the contact of liquid with such fumes consisting in a series of rotary conical baffles with central passages therethrough and rotary filtering means mounted concentrically therewith and adjacent thereto.

3. A metallurgical smoke filter, comprising a closed tank having means associated therewith for circulating liquid therethrough and for circulating fumes therethrough, spaced apart rotary baffles mounted and operated in said tank, and spaced apart reticulated rotary filters of conical form mounted for operation in said tank adjacent baffles.

4. A metallurgical smoke filter, comprising a horizontally extending closed tank equipped with means for circulating liquid therethrough from top to bottom and with means for circulating fumes therethrough from end to end, and means for promoting the contact of liquid with such fumes consisting in a series of rotary filters conical in form and reticulated, and baffle members associated with such filters.

5. A metallurgical smoke filter, comprising a horizontally extending closed tank having connections for circulating liquid therethrough from top to bottom, and for circulating fumes therethrough from end to end, means for dividing said tank into a series of compartments each with an individual liquid circulating system, said liquid circulating system of each compartment comprising a liquid supply pipe disposed to deliver liquid to the top portion of the compartment, and a drain from the bottom of each compartment, and filtering means in said tank for promoting the contact of liquid with passing fumes.

6. A metallurgical smoke filter, comprising a horizontally extending closed tank having connections for circulating liquid therethrough from top to bottom, and for circulating fumes therethrough from end to end, means for dividing said tank into a series of compartments each with an individual liquid circulating system, and filtering means in said tank for promoting the contact of liquid with passing fumes, each compartment of said tank having a separate sediment receiver at the bottom thereof.

In testimony whereof, I have signed my name to this specification.

WILLIAM H. BATES, Jr.